(12) United States Patent
Kalani et al.

(10) Patent No.: US 12,132,758 B1
(45) Date of Patent: Oct. 29, 2024

(54) HOST-LEVEL BOT DETECTION

(71) Applicant: Amazon Technologies, Inc., Seattle, WA (US)

(72) Inventors: Piyush Kalani, Newcastle, WA (US); Pranjal Shahajirao Deshmukh, Bellevue, WA (US); Mayur Chordiya, Issaquah, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 330 days.

(21) Appl. No.: 17/515,273

(22) Filed: Oct. 29, 2021

(51) Int. Cl.
*H04L 9/40* (2022.01)
*H04L 67/1014* (2022.01)

(52) U.S. Cl.
CPC ...... *H04L 63/1458* (2013.01); *H04L 63/1416* (2013.01); *H04L 63/1425* (2013.01); *H04L 63/20* (2013.01); *H04L 67/1014* (2013.01)

(58) Field of Classification Search
CPC ............ H04L 63/1458; H04L 63/1416; H04L 63/1425; H04L 63/1441; H04L 67/1014; H04L 67/1027; H04W 12/122; H04W 12/12
See application file for complete search history.

(56) References Cited

U.S. PATENT DOCUMENTS

| | | | |
|---|---|---|---|
| 9,734,184 B1* | 8/2017 | Lagacé | G06F 16/2282 |
| 11,886,367 B2* | 1/2024 | McLean | G06F 13/366 |
| 2010/0131668 A1* | 5/2010 | Kamath | H04L 47/32 |
| | | | 709/233 |
| 2016/0381048 A1* | 12/2016 | Zhao | H04L 63/1416 |
| | | | 726/23 |
| 2019/0104198 A1* | 4/2019 | Mutha | H04L 67/61 |

* cited by examiner

*Primary Examiner* — Shaqueal D Wade-Wright
(74) *Attorney, Agent, or Firm* — Davis Wright Tremaine LLP

(57) ABSTRACT

A system comprises a plurality of computing devices. Requests received by the system are distributed at random among the computing devices. A computing device, in response to receiving a request, stores a record of utilization of the computing device by a source of the request. The computing device determines to throttle requests from the source based, at least in part, on the utilization of the computing device by the source within the time period.

20 Claims, 10 Drawing Sheets

HOST-LEVEL BOT DETECTION

BACKGROUND

Web-based applications are increasingly the targets of malicious actors. These actors may attempt to degrade the performance of a web-based application through the use of scripts, or other automated tools, that mimic legitimate interactions with the application, but do so at rates that may degrade the performance of the web-based application and adversely effect the usage of the application by legitimate clients.

BRIEF DESCRIPTION OF THE DRAWINGS

Various techniques will be described with reference to the drawings, in which.

DETAILED DESCRIPTION

Figure 1:
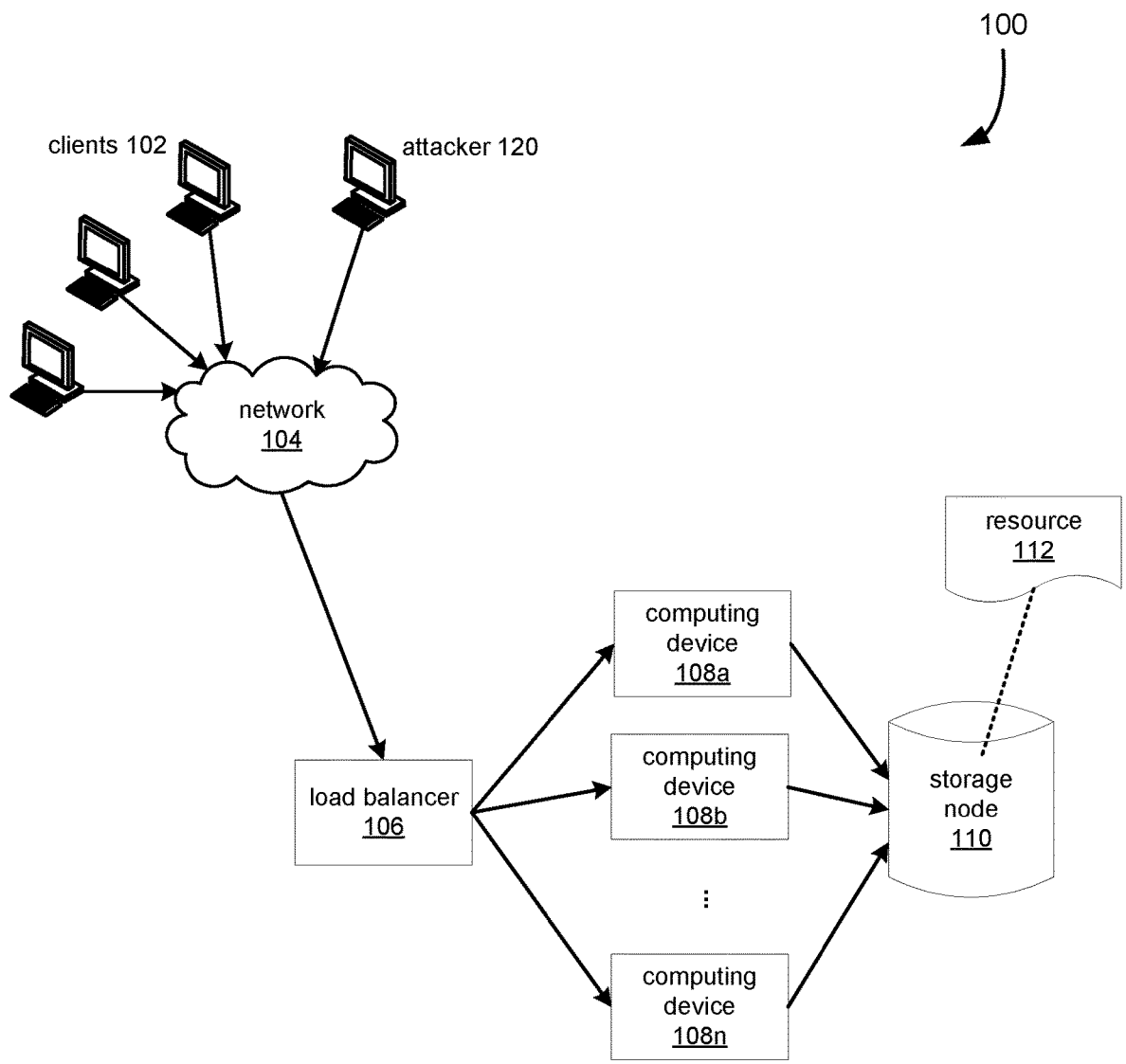
FIG. 1 illustrates an example system in which host-level bot detection is performed, according to at least one embodiment.

In an example, a web-based application implements host-level bot detection to identify a potential bot attack and throttle requests associated with a suspected source of the attack. The web-based application is implemented by a distributed system that comprises a number of computing devices, among which the application's workload is distributed. Each computing device, or host, independently identifies and responds to potential bot attacks by monitoring the frequency of requests it receives, irrespective of those requests received by other computing devices in the system. The use of this technique may accurately identify and counter bot attacks while avoiding the overhead of communicating between components of the distributed system.

In the example system, a computing device maintains a data structure which tracks, within one or more sliding windows of time, utilization of the computing device by requests associated with a particular host. The requests are those distributed to the computing device by the system, in order to balance workload. Accordingly, the requests tracked by the data structure may represent only a fraction of those received and processed by the system as a whole. The computing device may nevertheless leverage the statistical properties associated with a potential bot attack, stemming from the high volume of requests associated with such attacks, to make a local determination about whether or not the system, as a whole, is under attack.

One challenge to this approach is the potentially high volume of requests that a computing device may process, even when not under attack. The example system may employ a variety of techniques to reduce the overhead of maintaining the sliding windows, while still allowing for efficient detection of potential bot attacks. One such technique is for a computing device to sample a subset of incoming requests. The sampled subset is used to update the sliding windows in the data structure, while the remainder are processed normally.

Another challenge is that a given computing device may at times receive a high volume of requests from a single source, even under legitimate usage scenarios. This can happen, for example, because requests are distributed at random to the computing devices within the system. This randomness may, at times, cause requests from a particular source to be concentrated on a particular computing device. To reduce false positives, the example system can employ techniques such as using a longer sliding window, or examining utilization of the computing device, by requests associated with a given source, over multiple time windows.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example system in which host-level bot detection is performed, according to at least one embodiment. The example system 100 comprises a plurality of computing devices 108a-n which process requests issued by clients 102. In order to balance workload between the computing devices 108a-n, requests are routed between the computing devices 108a-n. In at least one embodiment of the example system 100, this is done by a load balancer 106, and improves system performance since work can be distributed more evenly across the available computing devices 108a-n.

A client 102 can comprise a computing device, potentially including but not limited to personal computers, smartphones, tablets, internet of things ("IoT") devices, and so on. The client 102 interacts, via a network 104, with the system 100 to access a service. A service can potential include, but is not limited to, web services, web applications, data storage and retrieval, compute services, orchestration services, and so on. An attacker 120 may also interact with the system 100, in ways similar to those practiced by the clients 102, but with the intent of interfering with the operation of the system 100. Due to the similarity, it can be difficult to distinguish between interactions initiated by the clients 102 and the attacker 120.

The requests processed by the system 100 can refer to any interaction between the clients 102 and the system 100. In at least one embodiment, a request comprises a communication by the client 102 to initiate some action to be performed by the system 100. A request also includes corresponding interactions by an attacker 120, and as noted, these are structured similarly or identically to legitimate requests.

The computing devices 108*a-n*, which may sometimes be referred to as hosts, can include any of a variety of computing devices, potentially including but not necessarily limited to web servers, application servers, IoT devices, storage devices, and so on.

Distributing workload between the computing devices 108*a-n* improves the capabilities of the system to respond to increased workload. However, there may still be vulnerabilities in the system 100 to bot attacks. A bot refers to a script or other program that is operated by an attacker 120 and that repeatedly attempts to perform an operation that, at least initially, appears to be legitimate. For example, a web application might include a shopping cart to which users can add items for subsequent purchase. Such interactions are generally legitimate, but in a bot attack, the attacker might execute a script that causes items to be repeatedly added or removed from the shopping cart at an exceedingly high rate. This may impact other users in a variety of negative ways, such as by slowing down or effectively stopping legitimate users from accessing the service.

In the example of FIG. 1, an attacker 120 might issue a high volume of requests in order to attempt to overwhelm the system 100. These may be described as bot attacks. A bot refers to any computing device or computing service that is capable of issuing a high volume of requests to the system 100. There are a variety of ways in which a bot attack might negatively impact the system 100. In one example, as depicted in FIG. 1, the requests might involve a resource 112 that is stored on a storage node 110. A storage node can include any of a variety of devices, systems, or services for storing data, potentially including but not limited to solid-state drivers, network attached storage, scalable, web-based storage services, and so on. As depicted in the example of FIG. 1, it could be the case that each of the computing devices 108*a-n*, or some subset of those devices, relies on the same storage node 110 or the same resource 112 on the storage node 110. By issuing a large number of requests that involve the resource 112, the attacker 120 can therefore negatively impact legitimate requests issued Accordingly, the system 100 includes capabilities for identifying and countering bot attacks. One challenge, in implementing these capabilities, arises from the distributed nature of the system. Because requests are distributed among the various computing devices 108*a-n* for processing, any individual one of the computing device 108*a-n* is not aware of requests being processed by the other devices, and is not innately positioned to identify a bot attack targeting the system as a whole. Some techniques rely on information sharing between the computing devices 108*a-n* to identify attacks. These could include techniques which rely on the load balancer 106, or on a number of load balancers or other devices to identify potential bots. These may be referred to as global techniques. However, global techniques may convey certain disadvantages.

In some cases, sharing information between the various computing devices is prohibitive due to factors such as network latency. In other cases, a central authority such as a load balancer does not have access to information that might be used to analyze potential bot attacks, such as the size or computational cost of a particular attack. Accordingly, a local techniques, such as embodiments of the techniques described herein, may be preferable to a global technique. Here, local refers to the detection being performed within the context of a single computing device, independently of any other device. For example, an individual computing device 108*a* might perform bot detection without sharing attack-related information with any of the other computing devices 108*b-n*. These techniques may be described as implementing host-level bot detection, since the detection is performed by each device independently of the other devices. Further, in embodiments, an individual device may implement mitigating measures, such as throttling traffic associated with the suspected source of the attack, independently of the other devices.

In an example embodiment, system 100 comprises a plurality of computing devices 108*a-n*. The computing devices each comprise at least one processor and a memory to store computer-executable instructions that, in response to execution by the at least one processor, causes the computing device to receive a request, wherein the computing device was selected, at least partially at random from among the plurality of computing devices, to receive the request.

The request is received via transmission over the network 104, and may have originated from either any of the clients 102 or the attacker 120. The executed instructions may then cause the system to store a record indicative of a number of times within a time period that requests associated with a source have been received by the computing device. The source may refer to the clients 102 or attacker 120, or to some property associated with requests sent from the client 102 or attacker. Examples of such properties are internet protocol ("IP") addresses, internet service provider ("ISP"), a geographic region, and so on. The executed instructions may then cause the system to determine, based at least in part on the number of times within the time period that requests associated with the source have been received by the computing device, to throttle requests associated with the source.

In a further aspect of this example embodiment, the time period is measured relative to a time period that was current as of the receipt of the request. The system therefore examines the number of times a request was received, from a particular source, using a sliding window of time. The system may track requests received over one or more sliding windows, such as over the last minute, five minutes, and ten minutes. This information can be stored as records in a data structure maintained, independently, by individual computing devices 108*a-n*. The records can comprise information indicating the numbers of times, for each of a corresponding plurality of time periods, that requests associated with the source has been received. The system examines these values and throttles requests associated with a source if requests received, in any of the time periods, exceeds a threshold value. Throttling can include refusing or delaying processing of a request.

Figure 2:
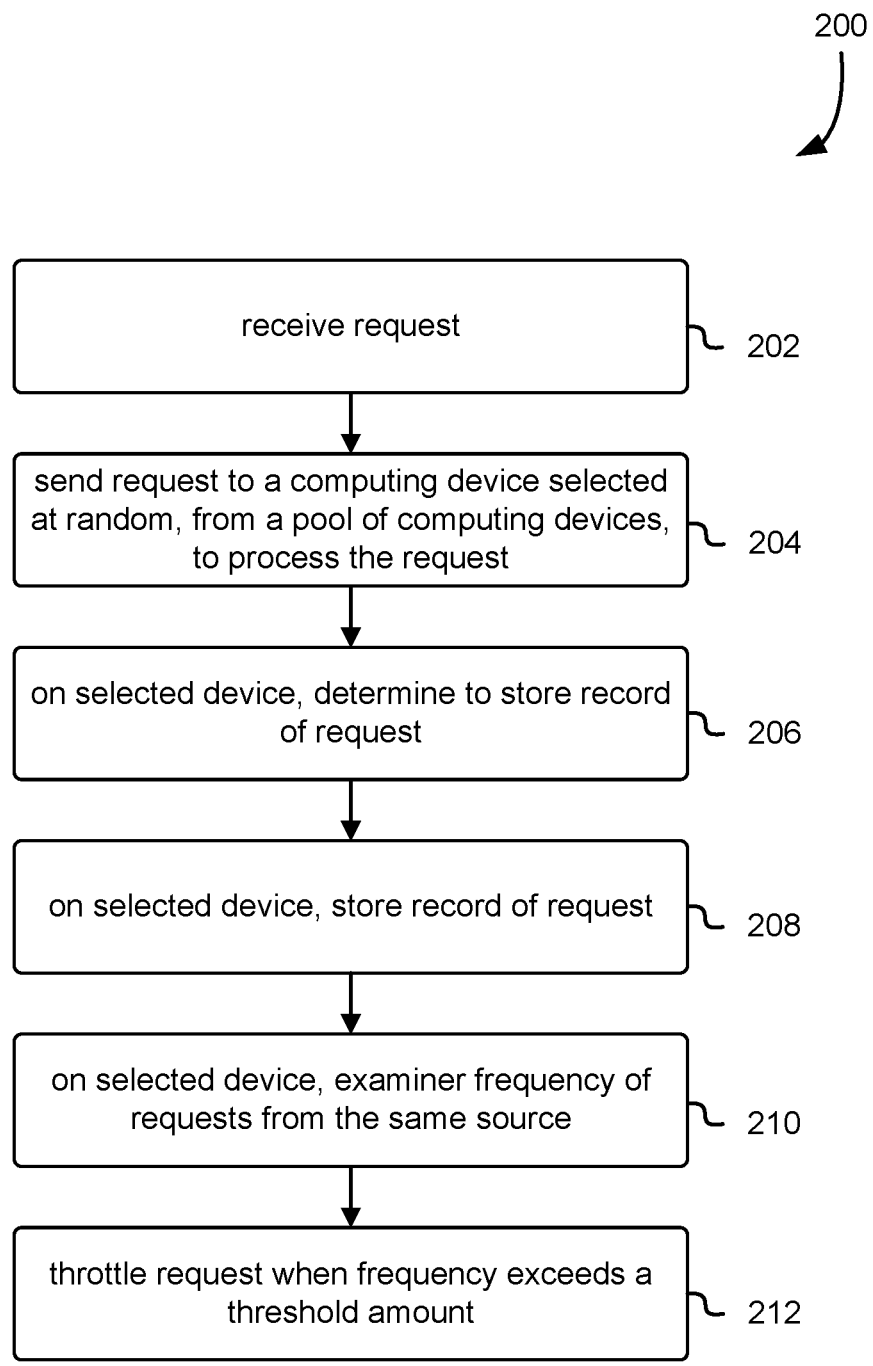
FIG. 2 illustrates an example process for performing host-level bot detection, according to at least one embodiment.

The example system 100 can be further understood in view of FIG. 2, which illustrates an example process for performing host-level bot detection, according to at least one embodiment. Although the example procedure 200 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another.

At 202, the system receives a request. The request can correspond to any of a variety of communications with the system that are intended to cause the system to perform a task. Examples of requests potentially include, but are not limited to, structured query language ("SQL") commands, hypertext transfer protocol ("HTTP") commands, representational state transfer ("REST") commands, and so forth.

At 204, the system sends the request to a computing device that is selected at random, from a pool of computing devices, to process the request. Note that as used here, random selection includes but is not limited to mathematical, computation, or other methods for generating random selections, but also the use of any process that produces an effectively or approximately random selection with respect to where any given request will be processed. For example, a load balancer may employ a round-robin technique in which each computing device in a pool of such devices is sequentially selected. This process is still considered random, since the computing device that will be selected to process a given request cannot be reliably determined. Further, for an attacker generating a high volume of requests, these requests can be expected to be distributed evenly across all of the available computing devices.

At 206, the selected computing device determines to store a record of the request. The computing device may receive a high volume of requests. In order to improve efficiency, embodiments may therefore implement a sampling strategy in which only a subset of requests are monitored, where monitoring refers to tracking requests from or associated with a particular source. Embodiments may determine to store the record using a sampling rate that indicates what proportion of requests, among those requests received by the computing device, should be monitored. For example, the computing device may be configured with a sampling rate of twenty percent, and consequently the computing device samples twenty out of every one hundred requests. When a request is sampled, a corresponding record is created, stored, or updated to indicate that a request from a given source has been received. When a request is not sampled, no record is created.

The computing device may also determine to sample every request associated with a particular source, once a record associated with that source has been previously stored as a result of the random sampling. For example, when a request is received, the computing device may determine that the source associated with the request is already tracked in a data structure. If it is already tracked, its corresponding counter for each time window may be updated. If it is not tracked a record of this particular request is not created. However, given that the system is looking for a bot traffic, and that such traffic has high frequency, traffic associated with the bot will eventually be tracked in the data structure. Consequently, sampling helps reduce load considerably, while still keeping the algorithm effective in catching bot traffic. The computing device may stop sampling requests associated with that source once the record ages out after a period of inactivity with respect to that particular source.

At 208, the selected computing device stores a record of the request. The record can comprise a value indicating the number of times, within a given time period, that a request has been received from the source of the request being processed. Multiple values, for multiple corresponding time periods, can be included in the same record. The record is stored in a manner that associates the record with the source, so that the record can be subsequently accessed using a source identifier. This can be accomplished in a variety of ways, potentially including but not limited to using a hash table or index structure which allows for efficiently locating a record based on one or more identifiers of the source.

As just noted, the record of the request comprises a value indicating the number of times, within a given time period, that a request has been received from a particular source. The source can be described as a potential attacker, in the sense that if the system determines that the frequency of requests from this source is too high for a given time period, the source can be considered to be malicious or, at least, deleterious to the operation of the system. At 210, the selected computing device examines the frequency of requests being received from the source of the request. Accordingly, at 212, the selected computing device throttles requests associated with the source when a frequency is above a threshold amount.

Figure 3:
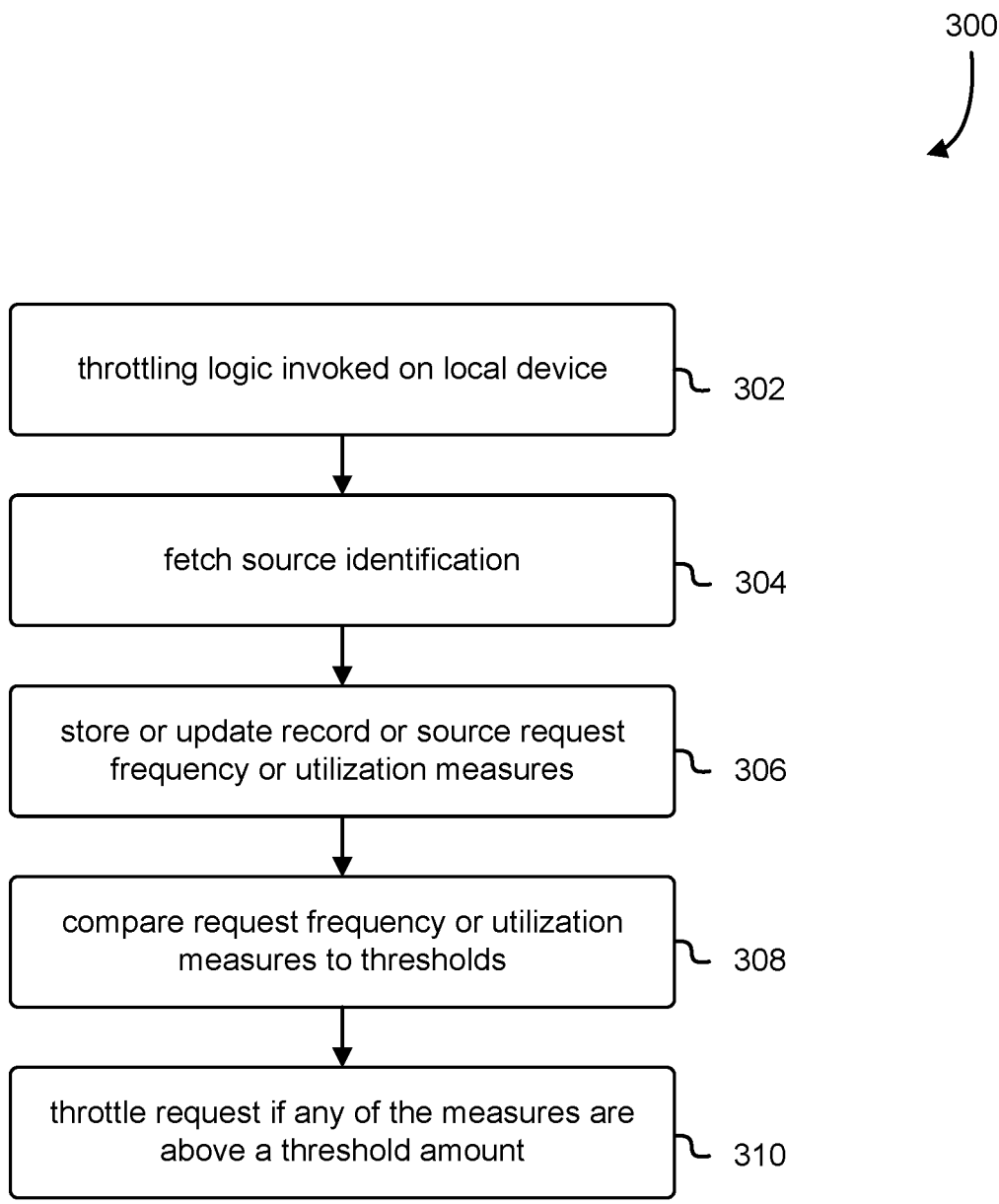
FIG. 3 illustrates an example process for determining to throttle requests associated with a suspected bot attack, according to at least one embodiment.

The operation of embodiments of computing devices performing host-level bot detection, such as any one of the computing devices 108*a-n* illustrated in FIG. 1, can be further understood in view of FIG. 3, which illustrates an example process for determining to throttle requests associated with a suspected bot attack, according to at least one embodiment. Although the example procedure 200 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another.

At 302, throttling logic is invoked on a computing device. Herein throttling logic refers to a portion of executable code and/or circuitry on a computing device that, as part of a larger component for processing requests, performs host-level bot detection and throttles requests it determines to be associated with suspected bot attacks. In the example 300 of FIG. 3, it is assumed, for illustrative purposes, that the throttling logic is invoked on a per-request basis. Consequently, elements 304-310 refers to steps or operations performed with respect to an individual request.

In some embodiments, a sampling technique is employed to limit the number of requests that are monitored. This technique, in at least one embodiment, comprises randomly selected some proportion of incoming requests, and performing, with respect to those requests, the operations described in relation to elements 304 to 310 of FIG. 3. Embodiments may also apply these operations, to any requests associated with a host that is already being monitored after a request associated with that host was previously sampled. Record associated with a source may be deleted, after a period of inactivity, from the records of those sources being monitored.

At 304, throttling logic on the computing device obtains information identifying the source of the request. The identifying information can include any piece or combination of information that identifies the source of a request with a suitable amount of specificity, potentially including but not limited to an account name or IP address associated with the source.

At 306, the throttling logic stores or updates a record of source request frequencies. A source request frequency refers to the number of times, in a given time window, that the source has issued a request. The record may include a number of request frequencies for a given source, corresponding to different time windows. Each of these may be updated. For example, a record might contain memory spaces to store values indicative of requests received in the past one minute, five minutes, and ten minutes. The values contained within each of these memory spaces might therefore be incremented by one in response to receiving the request.

In some embodiments, the values are adjusted based on an estimated or obtained measure of the computational impact of the request. These measures can be referred to as the resource utilization of the request. The values would then be compared against a budget, during a time period, for the computational impact. In some cases and embodiments, the measures can be further subdivided according to type, for example by measuring and recording I/O demands separately from processor utilization.

At 308, the throttling logic compares the request frequency or utilization measures to threshold values, so that if the frequency or utilization within any of the monitored time windows is above the threshold, the associated source is identified as the source of a bot attack. In response to this determination, at 310, the throttling logic causes the computing device to throttle requests associated with this source.

Figure 4:
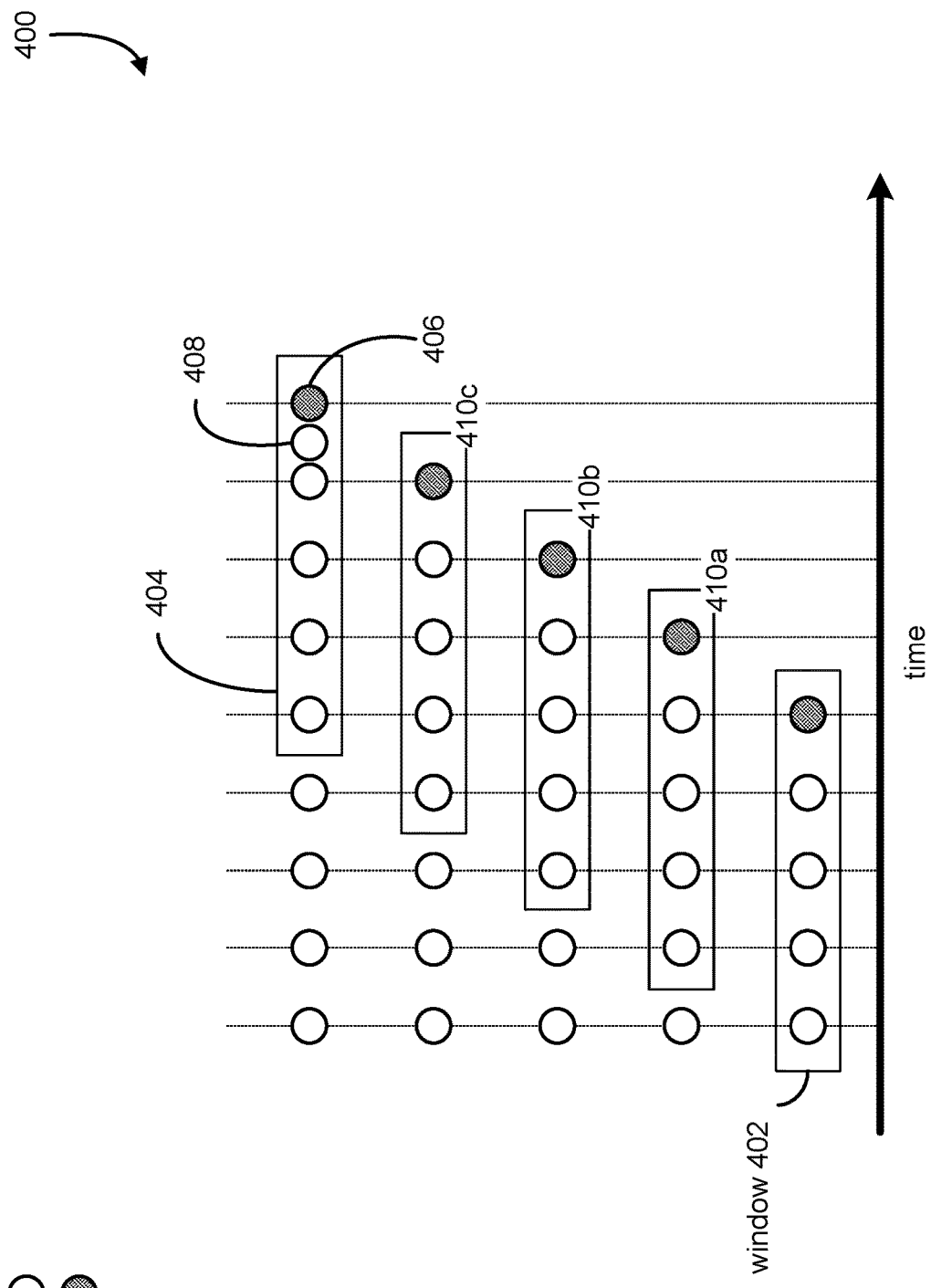
FIG. 4 illustrates an example of inspecting request frequencies over a sliding window, according to at least one embodiment.

FIG. 4 illustrates an example of inspecting request frequencies over a sliding window, according to at least one embodiment. In the example 400 of FIG. 4, throttling logic in a computing device, such as one of the computing devices 108a-n depicted in FIG. 1, may track a number of requests received, from a particular host, over a sliding window of time. As seen in the example 400, the computing device is receiving a regular series of requests from the host, so that in the time period of the first window 402, five requests have been received. This remains the case for several subsequent iterations. The throttling logic may, in at least one embodiment, examine requests received whenever a new request arrives. For each of the next several windows 410a-c examined, fewer than the maximum number of requests have been received. However, in the final illustrated period, within the window 404, the request 406 was preceded by an additional request 408, bringing the total count of requests to size. Since this is one greater than what is assumed, for illustrative purposes, to be a threshold maximum of five requests per window, the throttling logical may determine that the requests are associated with a bot attack and throttling the most recently received request 406.

Figure 5:
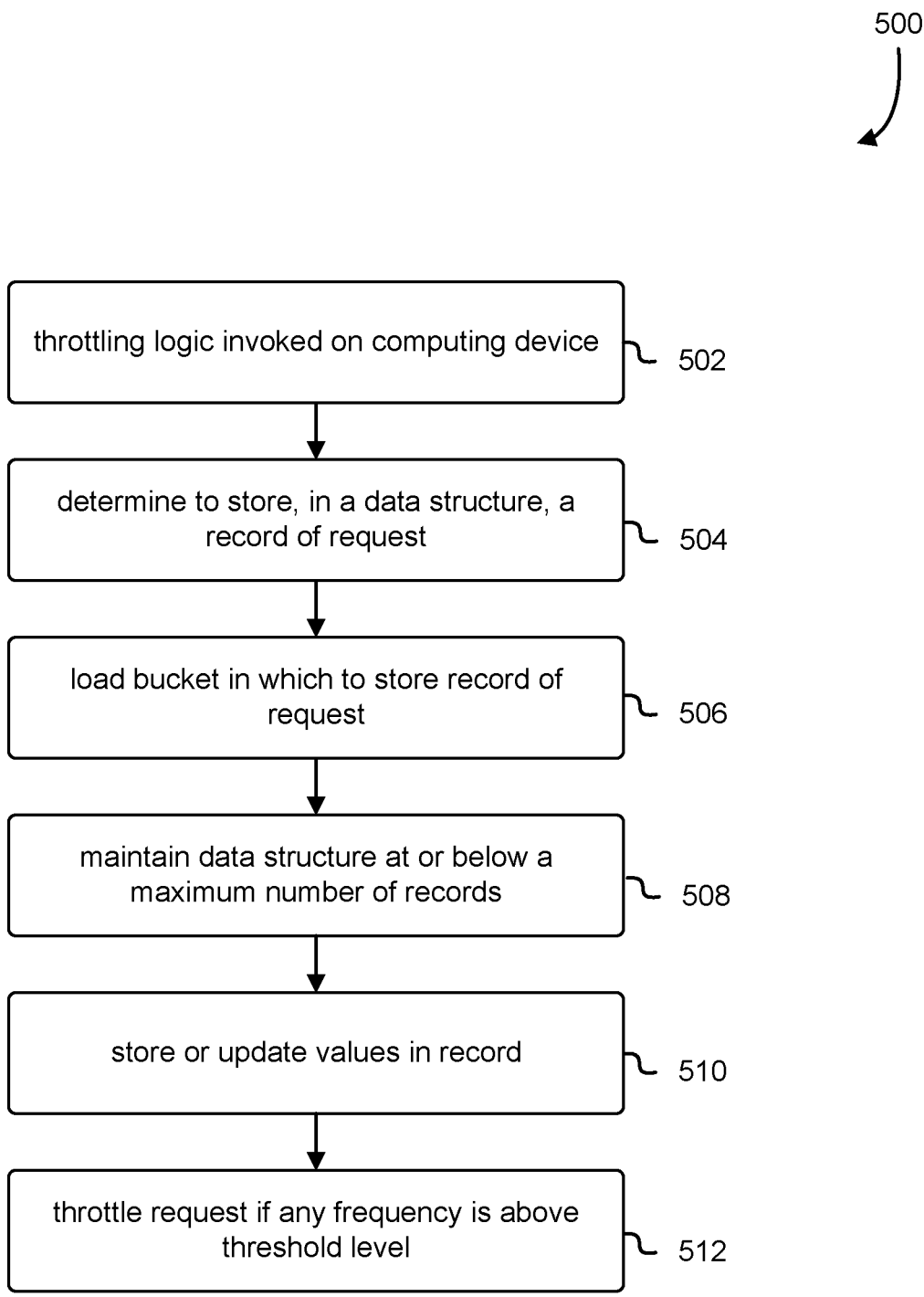
FIG. 5 illustrates an example process for maintaining records of request frequencies, according to at least one embodiment.

FIG. 5 illustrates an example process for maintaining records of request frequencies, according to at least one embodiment. Although the example procedure 500 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another.

At 502, throttling logic is invoked on a computing device, such as any one of the computing devices 108a-n depicted in FIG. 1. The throttling logic is invoked after the computing device has been selected to process a request. In at least one embodiment, the computing device receives the request and then invokes the throttling logic, which then performs operations described in relation to the subsequent elements 504-512 of the example procedure 500.

At 504, the computing device determines to store a record of the received request, based at least partially on a sampling rate and the monitoring status. In at least one embodiment of the example procedure 500, the record is stored in a data structure comprised of buckets, each of which contains one or more records, each corresponding to a particular source of requests. It will be appreciated, however, that this example of a data structure is intended to be illustrative of one of many potential embodiments, and that other data structures may be employed in other embodiments.

At 506, the computing device loads a bucket in which it will store a record of the request. This can involve adding a new record, or updating an existing record if one already exists for the associated source of the request.

At 508, the computing device maintains the data structure at or below a maximum number of records. For example, if the request is associated with a source that is not currently being tracked, and the request has been selected via sampling, the computing device may delete an older record from the structure in order to keep the structure before its maximum size. The computing device may wish to monitor no more than some threshold number of sources at any one time, in order to reduce the size of the data structure in which the records are maintained or the computational costs of maintaining it.

At 510, the computing device updates the frequency records, within the bucket, that are associated with the source. Here, frequency refers to the number of times, in a given time window, that the source has issued a request. Note that some embodiments may use resource utilization measures in place of, or in addition to, frequency.

At 512, the computing device throttles the request if any of the frequencies is above a threshold level. The computing device may track multiple time windows, and throttle requests associated with the corresponding source the total number of requests, in a given window, exceeds the threshold amount for that window. This approach may convey a technical advantage by helping to reduce false positives. Since random or effectively random processes may be used to assign requests to a computing device, a particular computing device might receive several legitimate requests from a client in a short period of time. By examining multiple time periods, throttling decisions can be made more reliably. In the case of a bot attack, a higher number of requests can be expected to be sustained over a long period of time, even though the requests from the bot are being distributed at random to the computing devices within the system. If a computing device continue to receive higher number of requests for a long time period, then it is safer to assume that the traffic is associated with a bot attack. Embodiments may therefore lower the threshold for longer time windows. Lowering this threshold helps to ensure that the total number of allowed requests across the entire fleet of computing device is smaller than what would be allowed without throttling, or even by throttling that is based only considering a shorter time window.

Figure 6:
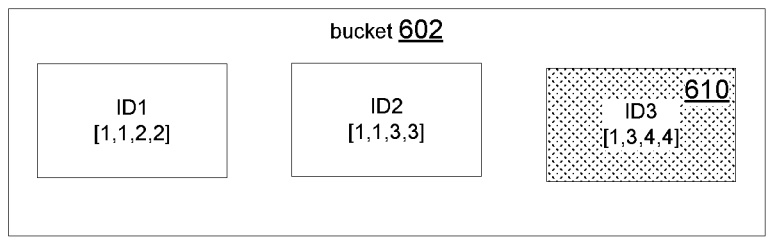
FIG. 6 illustrates an example data structure for maintaining records of request frequencies, according to at least one embodiment.
Figure 6:
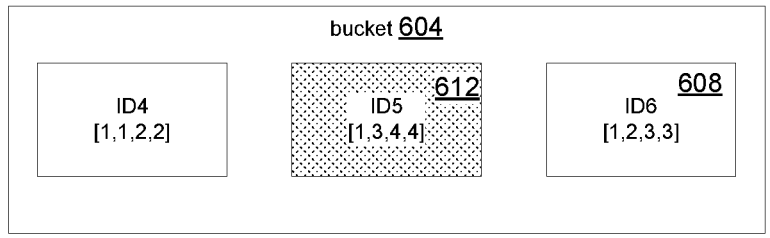
Figure 6:
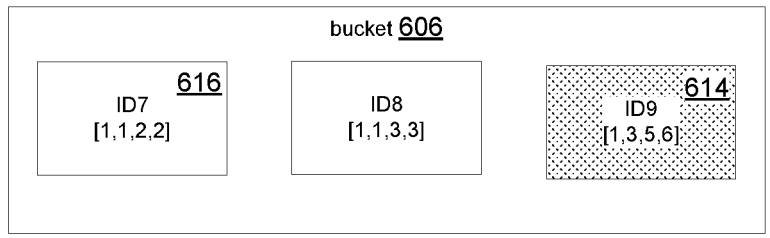

The example procedure 500 may be further understood in view of FIG. 6, which illustrates an example data structure for maintaining records of request frequencies, according to at least one embodiment. As depicted in the example 600 of FIG. 6, a data structure for storing and retrieving request frequency information can comprise a plurality of buckets 602-606. Each bucket may comprise records of request frequencies for one or more sources. For example, as illustrated in the figure, a bucket 602 might contain three records corresponding to the sources "ID1," "ID2," and "ID3." In embodiments, the identifier used can include any value, or combination of values, that identifies the source of the requests accounted for in the corresponding record. A variety of mechanisms may be used to determine which sources are included in which bucket. In at least one embodiment, the buckets are determined based on a hash of the identifier. Grouping records within buckets, as illustrated in FIG. 6, may convey a technical advantage in some embodiments by helping to avoid contention or reducing the number of I/O operations performed to access the records.

To illustrate an example of updating a record, it might be assumed that a request is received, and that the source of the request is identified as "ID6." The computing device, such as any one of the computing devices 108a-n, might then determine to monitor requests associated with ID6, and attempt to locate the record 610 in which request frequencies for "ID6" are stored. The computing device might then determine, based on some mapping between the identifier "ID6" and the bucket 604, that a record 608 associated with "ID6" has already been created. The corresponding frequencies within the record 608 might then be updated. If it is assumed, for the illustrative purposes of the example, that the threshold is set to no more than four requests for any one of the monitored periods, the source "ID6" would not be identified as a suspected bot, and the computing device's throttling logic would allow the request to be processed normally after updating the record 610 to reflect the arrival of the most recent request.

On the other hand, if requests associated with any of the sources "ID3," "ID5," or "ID6" were to arrive, each of these sources could be identified as potential bots. In the case of the records 610, 612 for "ID3" and "ID5," this would be because the new request could push the number of requests received in two of the tracked time periods above the threshold of four, depending on when the request was received relative to the last time the record was updated. In the case of the record 614 for "ID9," the totals are already above the threshold level, so the new request wouldn't change that if it was received within an applicable time period. Note, however, that if a request were received some time after the most recently received request for that source, the counters might be adjusted downwards accordingly. To demonstrate, it might be assumed that the tracked time periods are one minute, five minutes, ten minutes, and an hour. If a request for a source "ID7" was received two hours after the record 616 was last updated, it could be updated to [0, 0, 0, 1].

In at least one embodiment, records are deleted either after a period of inactivity or to make room for new records. For example, the computing device might be configured to track no more than two hundred sources at any one time. It will be appreciated that this amount is intended to be illustrative rather than limiting. Embodiments may determine appropriate numbers through experimentation, as well as by considering factors such as the number of computing devices among which workload is balanced, the number of requests being processed, and so forth. Similar considerations may be applied when determining other configuration values, such as the thresholds and time periods used to trigger throttling.

Figure 7:
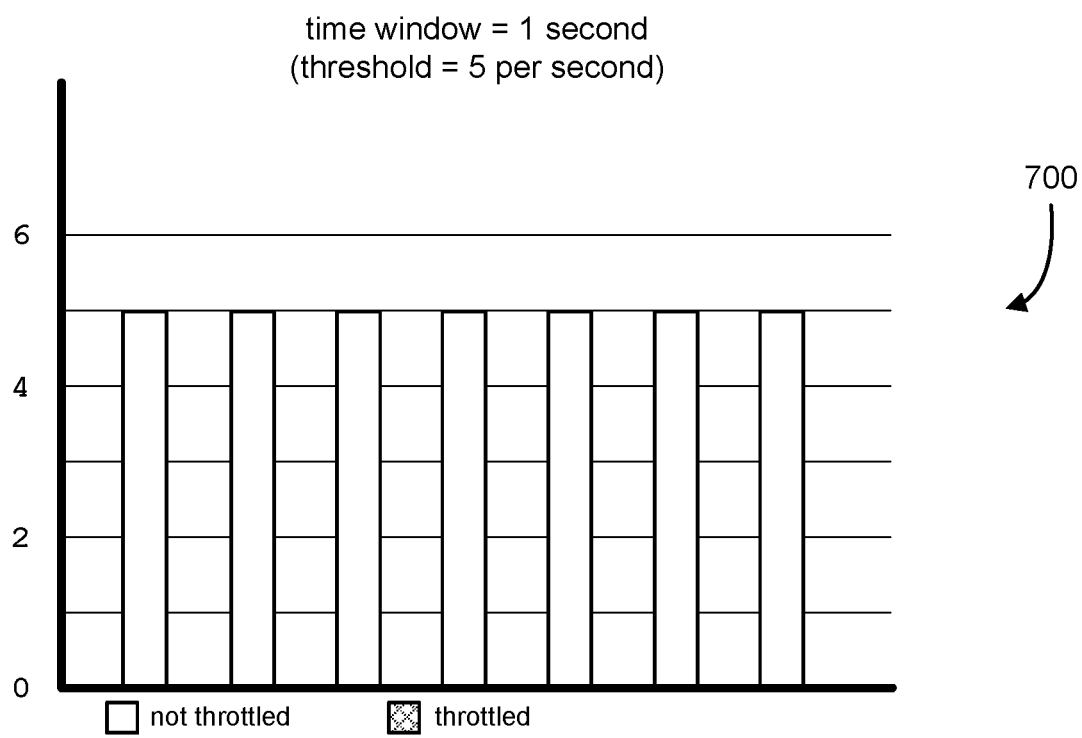
FIG. 7 illustrates an example process for determining to throttle requests associated with a suspected bot attack, according to at least one embodiment.
Figure 7:
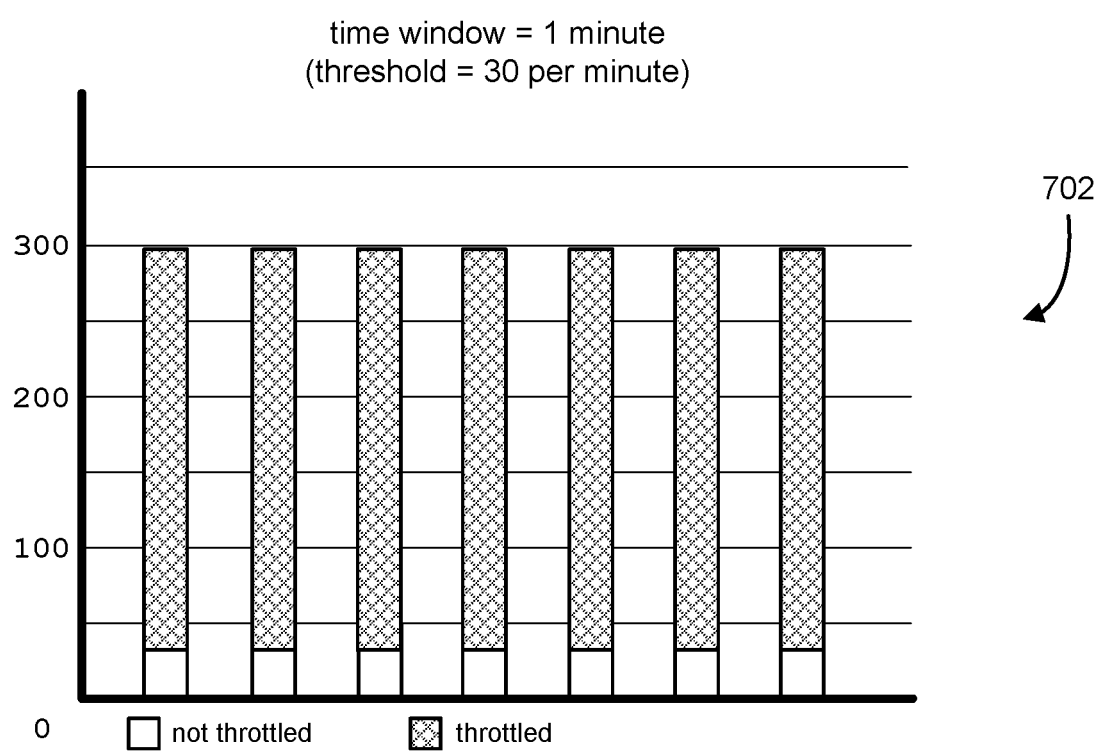

FIG. 7 illustrates an example process for determining to throttle requests associated with a suspected bot attack, according to at least one embodiment. In the example illustrated by the provided graphs 700 and 702, a computing device in a distributed system is configured to track requests over one second and one minute time windows. In the example of FIG. 7, the threshold is set to five requests per second and thirty requests per minute.

It could be further assumed, for the illustrative purposes of the example, that a distributed system comprises one hundred computing devices, and a malicious actor is sending requests to the distributed system at a rate of five hundred requests per second, and that these requests are distributed to each of the computing devices at approximately five requests per second. At this rate, monitoring of the one second time window, by a computing device, would tend to reveal a request rate that is at or below the example threshold of five requests per second. As such, in at least one embodiment, the computing device would not initiate throttling. However, if the request rate is sustained over time, monitoring of the one minute time intervals, by the computing device, could reveal rates of approximately 300 request per minute, as illustrated by the second graph 702. This is well above the example 30 requests per minute threshold. Accordingly, the computing device would initiate throttling on this basis, even though it did not do so based on its analysis of the one second time window. Due to throttling from the one minute time window, the effective rate allowed across the entire fleet of computing devices could be approximately 30*100/60=50 requests per second, much lower than the approximately five hundred requests per second of bot traffic which is being received in this example. The actual time window widths and threshold for each window can be determined based on number of computing device and what is a safe limit for the underlying components of the system to handle.

Figure 8:
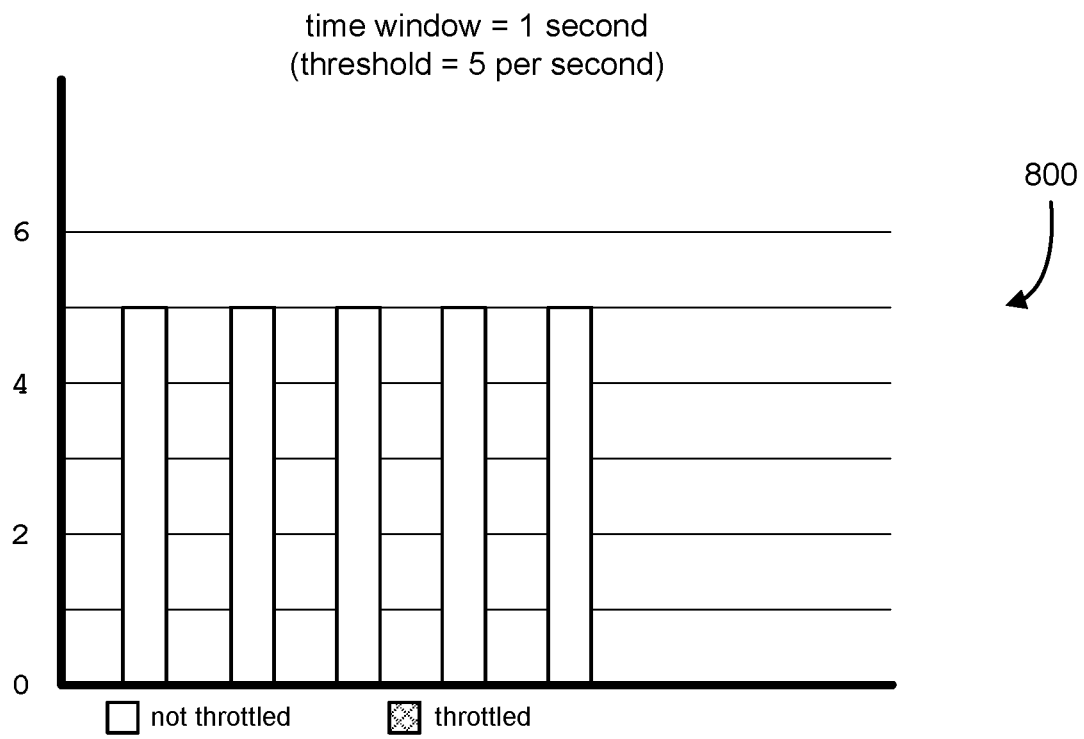
FIG. 8 illustrates an example process for determining to continue processing requests presumed to be associated with benign usage, according to at least one embodiment.
Figure 8:
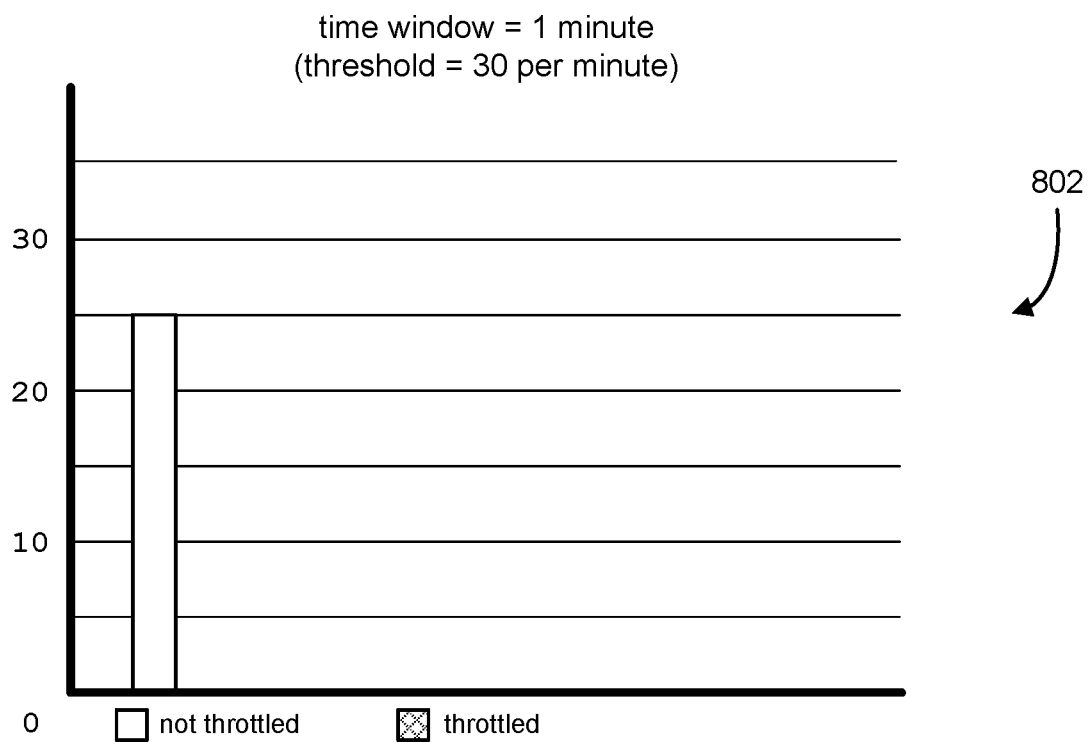

FIG. 8 illustrates an example process for determining to continue processing requests presumed to be associated with benign usage, according to at least one embodiment. In the example of FIG. 8 it is presumed for illustrative purposes that a computing devices in a distributed system is configured to track requests over one second and one minute time windows, and that the distributed system comprises one hundred of such computing devices. The threshold is set to five requests per second and thirty requests per minute. A client of the system, operating in benign fashion, is sends five requests per second for five seconds, and then stops. These requests could very well be distributed across the fleet of one hundred computing devices, most of which would receive either zero or one request from the client. However, in the scenario of FIG. 8, all of the requests are received and processed by a single computing device. As such, the computing device sees five incoming requests per second for five seconds, and no throttling occurs, as depicted in graph 800. Similarly, because the incoming requests stop after five seconds, examination of the one minute time window shows that only twenty five requests were received, below the threshold of thirty request per minute. Accordingly, as depicted in graph 802, no throttling occurs in this case.

Figure 9:
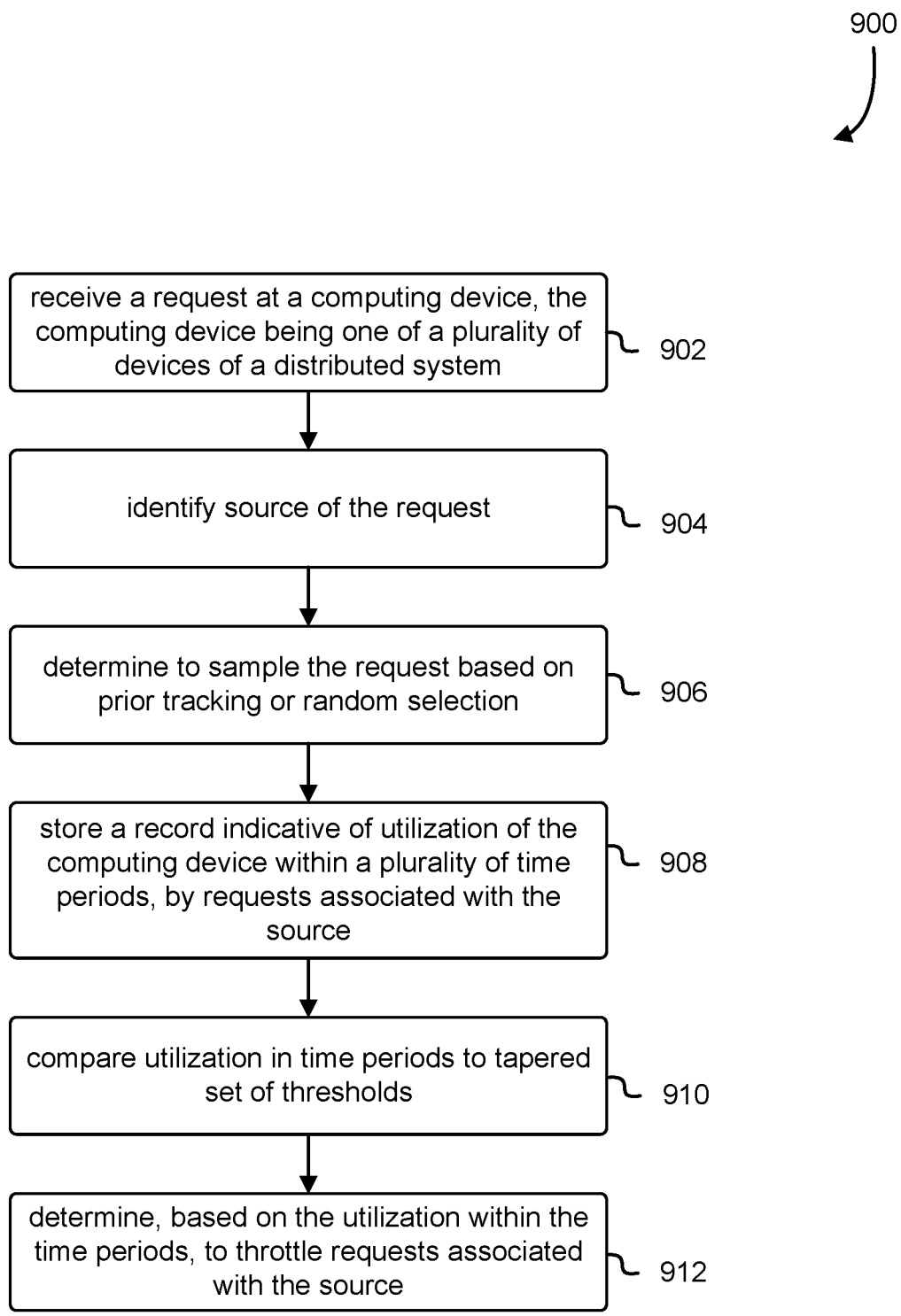
FIG. 9 illustrates an example process of a computing device performing host-level bot detection in a distributed system, according to at least one embodiment.

FIG. 9 illustrates an example process of a computing device performing host-level bot detection in a distributed system, according to at least one embodiment. Although the example procedure 900 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another.

At 902, a computing device receives a request. The computing device is one of a plurality of devices in a distributed system. The system balances workload by distributing requests among the computing devices, and may do so according to any of the various embodiments described in relation to FIGS. 1-6.

At 904, the computing device identifies a source of the request. The identifier may be an account name, IP address, geographic region, or any other identifier or combination of identifier suitable for identifying a potential attacker.

At 906, the computing device determines to sample the request. As explained herein, including with respect to the various embodiments described in relation to FIGS. 1-6, a computing device may determine to sample a record based on a sampling rate. In some embodiments, sampling may also be determined based on a record from the source of the request having been previously sampled and still being actively monitored.

At 908, the computing device stores a record indicative of utilization of the computing device, within a time period, by requests associated with the source. This may be done in a manner consistent with any of the various embodiments described herein, including those embodiments described in relation to FIGS. 1-6. The time period may be measured as a sliding window of time, relative to a time current when the request was received. In some embodiments, utilization corresponds to the number of times, within the time period, that the source has issued a request and that request has been received and sampled by the computing device. In other embodiments, some measure of computing capacity utilized by the request is used. In some cases and embodiments, the measure of capacity may be based on an estimate or prediction, while in other cases and embodiments, the request may be executed and actual capacity utilization measured. If so, any throttling decisions would be applied to requests the computing device receives subsequently, from the source.

At 910, the computing device compares utilization within the time periods to a tapered set of thresholds. Here, tapered refers to the thresholds, for different time periods, being set to different values. In at least one embodiment, the tapering is designed to account for relatively short periods in which the computing device receives a relatively high proportion of requests from a legitimate source. This can occur, for example, if a client is using the using the service with relatively high frequency, or if the computing device happens to be assigned a relatively high proportion of requests from the source during a given time period. The tapering may therefore allow for request frequencies that are relatively high for the shorter time windows, and relatively low for the longer time windows. For example, the threshold for a one second time window might be set at five requests per second, while the threshold for a one minute time window might be set to only thirty, rather than three hundred.

At 912, the computing device determines, based at least in part on the comparisons of utilization with the various time periods to the thresholds, to throttle requests associated with the source. The throttling decision may be made consistent with any the various embodiments described herein, including those described in relation to FIGS. 1-8. In at least one embodiment, if utilization within one or more of the time periods exceeds a threshold amount, the computing device determines to throttle the request. In some embodiments, the computing device determines to throttle if utilization in any one of the time periods exceeds a corresponding threshold, while in other embodiments the computing device throttles if a majority of the monitored time periods exceeds a respective threshold, or if all exceed a respective threshold. Still other embodiments may throttle based on patterns of utilization exhibited during the respective time windows.

As one skilled in the art will appreciate in light of this disclosure, certain embodiments may be capable of achieving certain advantages, including some or all of the following. Embodiments may be capable of more computationally efficient identification of bot attacks, due at least in part to the local application of the detection algorithm. Other embodiments may provide detection capabilities that more appropriately balance computational work associated with detection with accuracy.

Figure 10:
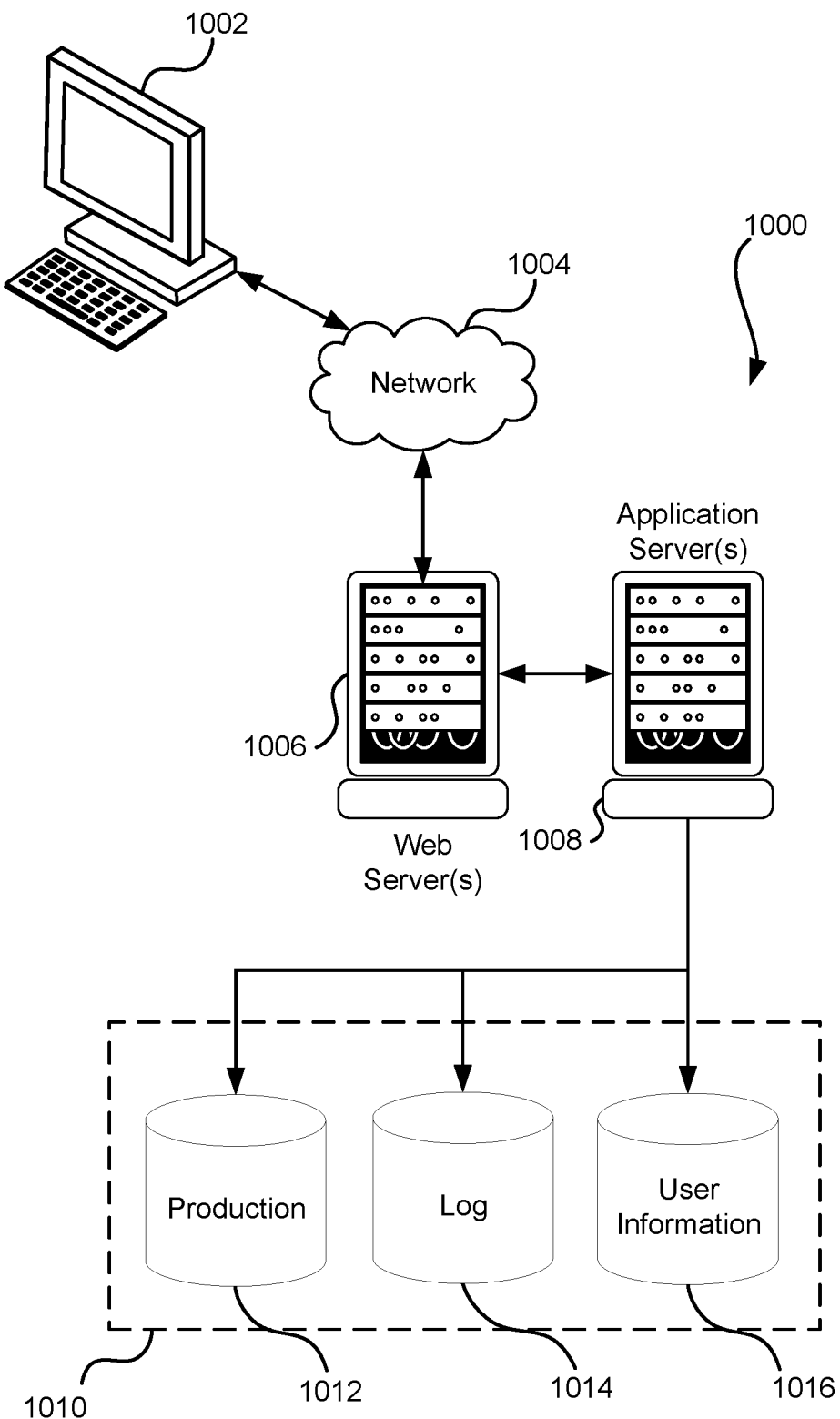
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as JavaR, C, C # or C++, or any scripting language, such as Ruby, PHP, Perl, Python or TCL, as well as combinations thereof. In an embodiment, the one or more servers also include database servers, including without limitation those commercially available from OracleR, MicrosoftR, SybaseR, and IBMR as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   receiving a request at a computing device of a plurality of computing devices, the request sent to the computing device based at least on a distribution of workload across the plurality of computing devices;
   determining, by the computing device, to store at least one record comprising information indicative of numbers of times within a plurality of time periods that requests have been received, by the computing device, from a source associated with the request;
   determining, by the computing device, to throttle requests associated with the source, the determining based at least in part on comparing a number of times requests directed to the computing device of the plurality of computing devices and associated with the source have been received, within one of the plurality of time periods, to a threshold amount corresponding to the one of the plurality of time periods; and
   throttling, at the computing device, requests associated with the source.

2. The computer-implemented method of claim 1, further comprising:
   determining, by the computing device, to store the at least one record based at least in part on a sampling rate indicative of a proportion of requests received by the computing device to be sampled.

3. The computer-implemented method of claim 1, wherein the computing device determines, independently of other computing devices of the plurality of computing devices, that the source is associated with a bot attack.

4. The computer-implemented method of claim 1, wherein threshold amounts corresponding to the plurality of time periods are tapered to permit bursts of requests to be processed without throttling.

5. The computer-implemented method of claim 1, further comprising:
maintaining a data structure comprising records indicative of numbers of times that the computing device has received requests associated with a respective source; and
deleting one or more records from the data structure when a number of records in the data structure exceeds a threshold amount.

6. A system, comprising:
a plurality of computing devices, wherein a computing device of the plurality of computing devices comprises at least one processor and a memory to store computer-executable instructions that, in response to execution by the at least one processor, causes the computing device to:
receive a request, wherein the computing device was selected from among the plurality of computing devices to receive the request;
store at least one record indicative of utilization, within a plurality of time periods, by requests received by the computing device and associated with a source; and
determine, based at least in part on utilization, within the plurality of time periods, by requests associated with the source, to the selected computing device, to throttle requests associated with the source.

7. The system of claim 6, wherein the memory is to store further computer-executable instructions that, in response to execution by the at least one processor, causes the computing device to:
determine to store the at least one record based, at least in part, on a sampling rate indicative of a proportion of requests, among requests received by the computing device, to be sampled.

8. The system of claim 6, wherein the computing device determines to throttle requests associated with the source independently of other computing devices of the plurality of computing devices.

9. The system of claim 6, wherein the plurality of time periods are relative to a time current as of receipt of the request.

10. The system of claim 6, wherein utilization comprises at least one of a number of times requests from the source have been received or an amount of resource consumption associated with the request.

11. The system of claim 6, wherein the memory is to store further computer-executable instructions that, in response to execution by the at least one processor, causes the computing device to:
maintain a data structure comprising records indicative of numbers of times that the computing device has received requests associated with a respective source; and
delete one or more records from the data structure when a number of records in data structure exceeds a threshold amount.

12. The system of claim 6, wherein the determination to throttle the requests associated with the source is based, at least in part, on comparing measures of utilization within the plurality of time periods to a corresponding plurality of threshold values, the plurality of threshold values tapered to permit bursts of requests.

13. The system of claim 6, wherein throttling comprises at least one of refusing to process the request or delaying processing of the request.

14. A non-transitory computer-readable storage medium storing thereon executable instructions that, as a result of being executed by one or more processors of a computer device, cause the computing device to at least:
receive a request, wherein the computing device was selected from among a plurality of computing devices, to process the request;
identify a source associated with the request;
store at least one record indicative of utilization, within a plurality of time periods, by requests received by the computing device and associated with the source; and
determine, based at least in part on utilization within one or more of the plurality of time periods, by requests associated with the source, to the selected computing device, to throttle requests associated with the source, wherein utilization is determined to be excessive based, at least in part, on comparison to one or more threshold values corresponding to the one or more of the plurality of time periods.

15. The non-transitory computer-readable storage medium of claim 14, wherein the instructions further comprise instructions that, as a result of being executed by the one or more processors, cause the computer device to:
determine to store the at least one record based, at least in part, on a sampling rate indicative of a proportion of requests, among requests received by the computing device, to be sampled.

16. The non-transitory computer-readable storage medium of claim 14, wherein the instructions further comprise instructions that, as a result of being executed by the one or more processors, cause the computer device to:
determine to throttle requests associated with the source without input received from other computing systems of the plurality of computing devices.

17. The non-transitory computer-readable storage medium of claim 14, wherein the instructions further comprise instructions that, as a result of being executed by the one or more processors, cause the computer device to:
respond to receiving the request by at least updating one or more values in the at least one record to indicate, with respect to a current time, utilization of the computing device in association with requests associated with the source.

18. The non-transitory computer-readable storage medium of claim 14, wherein utilization comprises at least one of a number of times requests from the source have been received or an amount of resource consumption associated with the request.

19. The non-transitory computer-readable storage medium of claim 14, wherein the instructions further comprise instructions that, as a result of being executed by the one or more processors, cause the computer device to:
maintain a data structure comprising records indicative of numbers of times that the computing device has received requests associated with a respective source; and
delete one or more records from the data structure when a number of records in data structure exceeds a threshold amount.

20. The non-transitory computer-readable storage medium of claim 14, wherein the one or more threshold values are tapered.

* * * * *